(12) United States Patent
Xia et al.

(10) Patent No.: US 10,571,918 B2
(45) Date of Patent: Feb. 25, 2020

(54) CLEANING METHOD AND DEVICE

(71) Applicant: Beijing Xiaomi Mobile Software Co., Ltd., Haidian District, Beijing (CN)

(72) Inventors: Yongfeng Xia, Beijing (CN); Ke Wu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 15/999,126

(22) Filed: Aug. 17, 2018

(65) Prior Publication Data
US 2019/0086921 A1    Mar. 21, 2019

(30) Foreign Application Priority Data

Aug. 17, 2017    (CN) .......................... 2017 1 0708796

(51) Int. Cl.
*G05D 1/02* (2020.01)
*A47L 11/24* (2006.01)
(Continued)

(52) U.S. Cl.
CPC .............. *G05D 1/021* (2013.01); *A47L 11/24* (2013.01); *A47L 11/4011* (2013.01);
(Continued)

(58) Field of Classification Search
CPC ...... G05D 1/021; G05D 1/0088; A47L 11/24; A47L 11/4011; A47L 11/4066; A47L 2201/04
See application file for complete search history.

(56) References Cited

U.S. PATENT DOCUMENTS

2002/0174506 A1    11/2002  Wallach et al.
2018/0210445 A1*    7/2018  Choi .................... G05D 1/0088

FOREIGN PATENT DOCUMENTS

CN          201572040 U      9/2010
CN          105796002 A      7/2016
(Continued)

OTHER PUBLICATIONS

NPL English machine translation of Chong (CN 106821157A) (Year: 2017).*
(Continued)

*Primary Examiner* — Mahmoud S Ismail
*Assistant Examiner* — Bakari Underwood
(74) *Attorney, Agent, or Firm* — Jun He Law Offices P.C.; James J. Zhu

(57) ABSTRACT

The present disclosure relates to a cleaning method and a cleaning device. The method includes: acquiring a map of a target area, the map identifying an obstacle in the target area; determining an uncleaned area that cannot be cleaned due to occupancy of the obstacle in the target area according to the map; determining whether the obstacle occupying the uncleaned area can be removed by the sweeper; and the sweeper removing the obstacle and cleaning the uncleaned area, when the obstacle occupying the uncleaned area can be removed by the sweeper. In the technical solution, when an obstacle is encountered during cleaning, the sweeper may mark the area as an uncleaned area, and when it is determined that the obstacle occupying the area may be removed, the obstacle is removed and the area is cleaned.

11 Claims, 10 Drawing Sheets

(51) Int. Cl.
*A47L 11/40* (2006.01)
*G05D 1/00* (2006.01)

(52) U.S. Cl.
CPC ........ *A47L 11/4066* (2013.01); *G05D 1/0088* (2013.01); *A47L 2201/04* (2013.01)

(56) References Cited

FOREIGN PATENT DOCUMENTS

| CN | 106155050 | A |   | 11/2016 |
|----|-----------|---|---|---------|
| CN | 106200645 | A |   | 12/2016 |
| CN | 106737709 | A |   | 5/2017  |
| CN | 106821157 | A | * | 6/2017  |
| CN | 106821157 | A |   | 6/2017  |
| CN | 106863305 | A |   | 6/2017  |
| CN | 106913289 | A |   | 7/2017  |
| CN | 106983454 | A | * | 7/2017  |
| CN | 106983454 | A |   | 7/2017  |
| EP | 2702919   | A2|   | 3/2014  |
| EP | 2963515   | A2|   | 1/2016  |
| JP | 2015009109| A |   | 1/2015  |
| JP | 2016086906| A |   | 5/2016  |
| KR | 20090018562 | A |   | 2/2009 |
| KR | 101362773   | B1|   | 2/2014 |
| KR | 20160100149 | A |   | 8/2016 |
| WO | 0137060     | A1|   | 5/2001 |

OTHER PUBLICATIONS

NPL English machine translation of Yue (CN 106983454A) (Year: 2017).*

International Search Report for PCT/CN2017/112728, dated Jan. 24, 2018.

Extended European Search Report of European Application No. 18189349.6, dated Mar. 14, 2019.

Non-final Office Action in Russian application No. 2018116906/12, dated Sep. 27, 2018.

Publication document for corresponding PCT application with English version of International Search Report, dated Feb. 21, 2019.

Office Action for Chinese Application No. 201710708796.X(dated Apr. 28, 2019).

The Office Action in Japanese Patent Application No. 2018-503792, dated Oct. 23, 2019.

* cited by examiner

CLEANING METHOD AND DEVICE

CROSS-REFERENCE TO RELATED APPLICATIONS

This application is based and claims priority to Chinese Patent Application Serial No. 201710708796.X filed with the State Intellectual Property Office of P. R. China on Aug. 17, 2017, the entire contents of which are incorporated herein by reference.

TECHNICAL FIELD

The present disclosure generally relates to the field of data processing technology, and more particularly, to a cleaning method and a cleaning device.

BACKGROUND

With the rapid development of science and technology, more and more intelligent household appliances have entered tens of thousands of households, improving people's living comfort and convenience. For example, in order to reduce the labor required to clean rooms, more and more people choose to use sweepers to clean the room.

In the related art, in order to avoid collision into furniture disposed in a room, a sweeper can scan a target area to be cleaned with infrared or ultrasonic to detect the furniture in its cleaning path. When the sweeper encounters a piece of furniture while cleaning the room, the sweeper can automatically make a turn to avoid collision into the furniture during the cleaning.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

According to a first aspect of the embodiments of the present disclosure, there is provided a cleaning method, applied in a sweeper. The method includes:

acquiring a map of a target area to be cleaned, the map identifying an obstacle in the target area;

determining an uncleaned area that cannot be cleaned due to occupancy of the uncleaned area by the obstacle in the target area according to the map;

determining whether the obstacle occupying the uncleaned area can be removed by the sweeper; and removing, by the sweeper, the obstacle from the uncleaned area and cleaning, by the sweeper, the uncleaned area, if it is determined that the obstacle occupying the uncleaned area can be removed by the sweeper.

The advantageous effects provided by the embodiment of the present disclosure include the following. When an obstacle is encountered during cleaning, an area occupied by the obstacle may be marked as an uncleaned area, and when it is determined that the obstacle occupying the area may be removed, the obstacle is removed and the area is marked as cleaned. It can improve flexibility in cleaning a room, ensure cleaning quality, and improve user experience.

In one embodiment, determining whether the obstacle occupying the uncleaned area can be removed by the sweeper includes:

determining a piece of furniture represented by the obstacle occupying the uncleaned area;

determining a furniture type of the piece of furniture represented by the obstacle, the furniture type including temporary furniture or stationary furniture; and determining that the obstacle occupying the uncleaned area can be removed by the sweeper when the furniture type of the piece of furniture represented by the obstacle is temporary furniture.

The advantageous effects provided by the embodiment of the present disclosure include the following. It is determined whether the obstacle may be removed according to the furniture type of the furniture represented by the obstacle. It may improve convenience and accuracy of determining movability of the obstacle.

In an embodiment, determining that the obstacle occupying the uncleaned area can be removed by the sweeper when the furniture type of the piece of furniture represented by the obstacle is temporary furniture includes:

determining whether the piece of furniture represented by the obstacle is a preset movable furniture when the furniture type of the piece of furniture is temporary furniture; and determining that the obstacle occupying the uncleaned area can be removed by the sweeper when the piece of furniture represented by the obstacle is the preset movable furniture.

The advantageous effects provided by the embodiment of the present disclosure include the following. When it is determined that the furniture type of the piece of furniture represented by the obstacle is temporary furniture, it may be further determined whether the piece of furniture is a preset movable furniture. When the piece of furniture is the preset movable furniture, it is confirmed that that the obstacle occupying the uncleaned area may be removed, thereby avoiding unexpected damage caused by the movement of furniture such as a stroller or a vase which is unmovable during cleaning.

In an embodiment, determining a furniture type of the piece of furniture represented by the obstacle includes:

acquiring a correspondence relationship between furniture and furniture types, the correspondence relationship associating one or more pieces of furniture with respective furniture types; and acquiring the furniture type of the piece of furniture represented by the obstacle occupying the uncleaned area according to the correspondence relationship between furniture and furniture types.

The advantageous effects provided by the embodiment of the present disclosure include the following. According to the correspondence relationship between furniture and furniture types, a furniture type of the piece of furniture represented by the obstacle occupying the uncleaned area is determined. Thus, it can improve convenience and accuracy in determining the furniture type.

In an embodiment, determining whether the obstacle occupying the uncleaned area can be removed by the sweeper includes:

determining whether a size of the obstacle occupying the uncleaned area falls within a preset size range; and determining that the obstacle occupying the uncleaned area can be removed by the sweeper when the size of the obstacle occupying the uncleaned area falls within the preset size range.

The advantageous effects provided by the embodiment of the present disclosure include the following. It is determined whether the obstacle may be removed according to the size of the obstacle. It may improve convenience and accuracy of determining movability of the obstacle.

In an embodiment, determining that the obstacle occupying the uncleaned area can be removed by the sweeper when the size of the obstacle occupying the uncleaned area falls within the preset size range includes:

acquiring a thrust force required for removing the obstacle when the size of the obstacle occupying the uncleaned area falls within the preset size range; and determining that the obstacle occupying the uncleaned area can be removed by the sweeper when the thrust force required is smaller than or equal to a preset thrust threshold value.

The advantageous effects provided by the embodiment of the present disclosure include the following. It is determined whether the obstacle may be removed according to the size of the obstacle and the magnitude of the thrust force required for moving the obstacle. It may improve the convenience and accuracy of determining movability of the obstacle.

In an embodiment, the cleaning method may further include:

moving the obstacle back to an original position of the uncleaned area and marking the uncleaned area as a cleaned area, after cleaning of the unclean area is completed.

The advantageous effects provided by the embodiment of the present disclosure include the following. After the cleaning is completed, the obstacle may be moved to the original position, to facilitate usage for the user, and to retain the layout of the room based on user habits in addition to the thorough cleaning of the room, which can improve user experience.

According to a second aspect of the embodiments of the present disclosure, there is provided a cleaning device, including:

a first acquiring module configured to acquire a map of a target area to be cleaned, the map identifying an obstacle in the target area;

a first determining module configured to determine an uncleaned area that cannot be cleaned due to occupancy of the uncleaned area by the obstacle in the target area according to the map;

a second determining module configured to determine whether the obstacle occupying the uncleaned area can be removed by the sweeper; and a removing-cleaning module configured to remove the obstacle from the uncleaned area and clean the uncleaned area, if it is determined that the obstacle occupying the uncleaned area can be removed by the sweeper.

In an embodiment, the second determining module includes:

a first determining sub-module configured to determine a piece of furniture represented by the obstacle occupying the uncleaned area;

a second determining sub-module configured to determine a furniture type of the piece of furniture represented by the obstacle, the furniture type including temporary furniture or stationary furniture; and a first confirming sub-module configured to determine that the obstacle occupying the uncleaned area can be removed by the sweeper when the furniture type of the piece of furniture represented by the obstacle is temporary furniture.

In an embodiment, the first confirming sub-module includes:

a determining unit configured to determine whether the piece of furniture presented by the obstacle is a preset movable furniture when the furniture type of the piece of furniture represented by the obstacle is temporary furniture; and a first confirming unit configured to determine that the obstacle occupying the uncleaned area can be removed by the sweeper when the piece of furniture represented by the obstacle is the preset movable furniture.

In an embodiment, the second determining sub-module includes:

a first acquiring unit configured to acquire a correspondence relationship between furniture and furniture types, the correspondence relationship associating one or more pieces of furniture with respective furniture types; and a second acquiring unit configured to the furniture type of the piece of furniture represented by the obstacle occupying the uncleaned area according to the correspondence relationship between furniture and furniture types.

In an embodiment, the second determining module includes:

a third determining sub-module configured to determine whether a size of the obstacle occupying the uncleaned area falls within a preset size range; and a second confirming sub-module configured to determine that the obstacle occupying the uncleaned area can be removed by the sweeper when the size of the obstacle occupying the uncleaned area falls within the preset size range.

In an embodiment, the second confirming sub-module includes:

a third acquiring unit configured to acquire a thrust force required for removing the obstacle when the size of the obstacle occupying the uncleaned area falls within the preset size range; and a second confirming unit configured to determine that the obstacle occupying the uncleaned area can be removed by the sweeper when the thrust force required is smaller than or equal to a preset thrust threshold value.

In an embodiment, the cleaning device further including:

a restoring module configured to move the obstacle back to an original position of the uncleaned area and mark the uncleaned area as a cleaned area, after cleaning of the uncleaned area is completed.

According to a third aspect of the embodiments of the present disclosure, there is provided a cleaning device, including:

a processor; and a memory for storing instructions executable by the processor;

wherein the processor is configured to perform:

acquiring a map of a target area to be cleaned by a sweeper, the map identifying an obstacle in the target area;

determining an uncleaned area that cannot be cleaned due to occupancy of the uncleaned area by the obstacle in the target area according to the map;

determining whether the obstacle occupying the uncleaned area can be removed by the sweeper; and removing the obstacle from the uncleaned area and cleaning the uncleaned area, if it is determined that the obstacle occupying the uncleaned area can be removed by the sweeper.

According to a fourth aspect of the embodiments of the present disclosure, there is provided a computer-readable storage medium having stored therein instructions that, when being executed by a processor of a device, cause the device to implement the steps of the method according to the embodiments of the first aspect.

It is to be understood that both the foregoing general description and the following detailed description are exemplary only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The technical solution provided in the embodiment of the present disclosure relates to a sweeper, that is, a sweeper robot. The sweeper may be connected to a terminal via an infrared, Bluetooth or wireless communication network. In the related art, when the sweeper encounters an obstacle while cleaning a room, the sweeper can bypass the obstacle and clean up the surroundings of the obstacle. However, in order to facilitate the user's activities in the room, some light and convenient furniture such as stools or trash cans can be placed on the floor of the room. If the sweeper bypasses a stool or a trash can when encountering the stool or the trash, the floor temporarily occupied by the stool or the trash can cannot be cleaned by the sweeper, causing poor user experience. In the technical solution provided in the embodiment of the present disclosure, when the sweeper encounters an obstacle during cleaning, the sweeper may mark the area occupied by the obstacle as an uncleaned area. Furthermore, when it is determined that the obstacle occupying the area may be removed, the sweeper may remove the obstacle and clean the area. Such arrangement can improve flexibility in cleaning a room, ensure cleaning quality, and improve user experience.

Figure 1A:
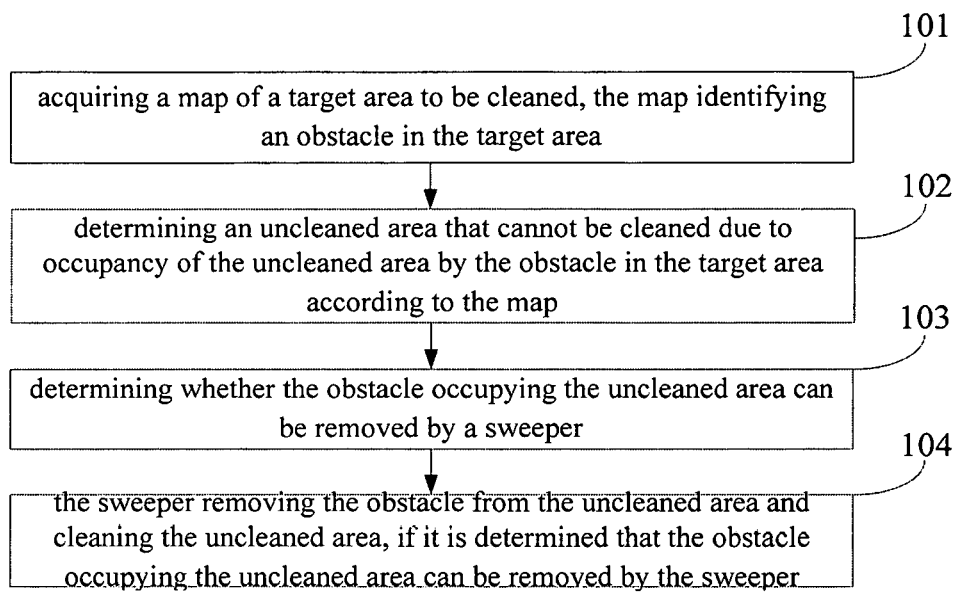
FIG. 1a is a flowchart illustrating a cleaning method according to an exemplary embodiment.

FIG. 1a is a flowchart illustrating a cleaning method according to an exemplary embodiment. The method can be applied in a sweeper, i.e. a sweeper robot. As shown in FIG. 1a, the cleaning method includes the following steps 101 to 104.

In step 101, a map of a target area to be cleaned is acquired, the map identifying an obstacle in the target area.

For example, when the sweeper is cleaning a room, i.e. the target area in the embodiment, the sweeper may encounter a plurality of obstacles, such as edges of furniture or supporting parts of the furniture. When an obstacle is detected, the obstacle may be marked in the map of the room according to a bottom area of the obstacle. Specifically, the sweeper may determine the obstacle encountered through an obstacle-avoidance function while cleaning the room. Then, the sweeper may scan the obstacle through a sensor mounted on the sweeper, and determine a size ratio of the obstacle relative to a size of the sweeper. Further, the sweeper may acquire a contact area between the obstacle and a floor (that is, the bottom area of the obstacle) where the obstacle stands according to the size of the sweeper, and mark the obstacle in the map of the room according to the bottom area. The map of the room is the map of the target area. The map of the room can illustrate a layout of the room and various obstacles placed on the fluor of the room.

In step 102, an uncleaned area that cannot be cleaned due to occupancy of the uncleaned area by the obstacle in the target area is determined according to the map.

For example, after the map identifying an obstacle is acquired, the sweeper may acquire the area occupied by the obstacle according to the map, and then set or mark the area as an uncleaned area. If a plurality of obstacles are marked on the map, the area occupied by each of the plurality of obstacles may be set as an uncleaned area. That is, a plurality of uncleaned areas may be acquired according to the map. Each of the uncleaned areas may be processed according to the method provided by the embodiments of the present disclosure.

Optionally, after the map identifying one or more obstacles is acquired, the sweeper may determine whether a bottom area of each obstacle is less than or equal to a preset area threshold value. Then, the sweeper may set an area occupied by an obstacle which has a bottom area smaller than or equal to the preset area threshold value as an uncleaned area, and may not mark an area occupied by an obstacle which has a bottom area larger than the preset area threshold value.

In step 103, it is determined whether the obstacle occupying the uncleaned area can be removed by the sweeper.

For example, after the uncleaned area occupied by the obstacle is acquired, the sweeper may determine whether the obstacle may be removed according to a size of the obstacle occupying the uncleaned area or a type of a piece of furniture represented by the obstacle. For example, during initialization, the sweeper may store a preset threshold value. If the sweeper determines that the size of an obstacle in any direction is larger than or equal to the preset threshold value, it indicates that the obstacle has a relatively large size, and it is difficult to remove the obstacle. If the sweeper determines that the sizes of an obstacle in all directions are smaller than the preset threshold value, it indicates that the obstacle has a relatively small size, and may be removed.

If the sweeper acquires a plurality of uncleaned areas according to the map, the sweeper may determine whether the obstacle occupying each of the uncleaned areas may be removed according to the size of the obstacle occupying the uncleaned area or a type of a piece of furniture represented by the obstacle.

In step 104, when the obstacle occupying the uncleaned area can be removed by the sweeper, the sweeper removes the obstacle from the uncleaned area and clean the uncleaned area.

For example, if the sweeper determines that the obstacle occupying the uncleaned area can be removed by the sweeper, the sweeper's function of removing the obstacle may be enabled. At this time, the sweeper may search for an optimal acting point on the obstacle, move to the optimal acting point and push the obstacle at the optimal acting point. Then, the sweeper may increase a forward thrust force applied to the obstacle, to remove the obstacle to another area. After that, the sweeper may clean the uncleaned area, to ensure thorough cleaning of the target area.

In some embodiments, after the cleaning is completed, the sweeper may also move the obstacle back to an original position of the unclean area, i.e. where the obstacle is originally placed in the target area. That is, the sweeper may move the obstacle that has been moved to other area back to the original position that has been cleaned by the sweeper, to retain the layout of the room based on user habits in addition to the thorough cleaning of the room, which can improve user experience.

Specifically, after the cleaning of the uncleaned area is completed, the uncleaned area may be marked as a cleaned area to avoid moving the obstacle occupying the area again, so as to prevent the obstacle from being unexpectedly damaged during the additional moving process and to avoid extending the working hours for the sweeper.

In the technical solution provided in the embodiment of the present disclosure, when an obstacle is encountered during cleaning, the area occupied by the obstacle may be marked as an uncleaned area, and when it is determined that the obstacle occupying the area may be removed, the obstacle is removed and the area is cleaned. Such arrangement can improve flexibility in cleaning a room, ensure cleaning quality, and improve user experience.

Figure 1B:
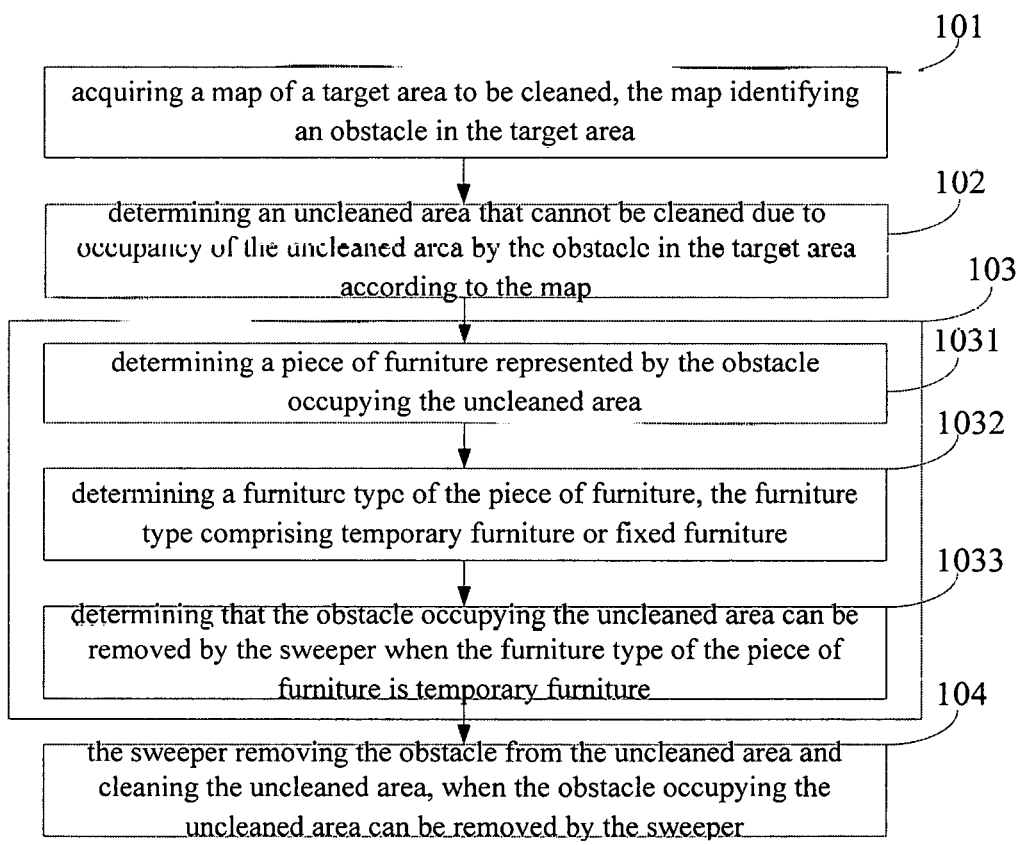
FIG. 1b is a flowchart illustrating a cleaning method according to an exemplary embodiment.

In an embodiment, as shown in FIG. 1b, in step 103, determining whether the obstacle occupying the uncleaned area may be removed by the sweeper may be performed through steps 1031 to 1033.

In step 1031, a piece of furniture represented by the obstacle occupying the uncleaned area is determined.

For example, after the sweeper acquires a map marked with a plurality of obstacles, the sweeper may classify the plurality of obstacles according to a bottom area of each obstacle. For example, when the bottom area of the obstacle is smaller than or equal to a first preset threshold value, the obstacle is determined as a first obstacle. When the bottom area of the obstacle is larger than or equal to a second preset threshold value, the obstacle is determined as a second obstacle. It is assumed that N first obstacles and M second obstacles are acquired through the above classification method, where both N and M are integers greater than or equal to 0. Since the first obstacles have relatively small bottom areas, the first obstacles may be considered as supporting parts of furniture, such as a table leg, a stool leg, a sofa leg and the like. According to the positions of the N first obstacles, the distance between each two of the first obstacles may be acquired, and then the S pieces of furniture represented by the first obstacles may be acquired. Since the second obstacles have relatively large bottom areas, the second obstacles may be considered as floor-standing furniture, such as a floor-standing bed, a floor-standing coffee table, a floor-standing stool and the like. According to the bottom areas of the M second obstacles, the M pieces of furniture represented by the M second obstacles may be acquired.

In step 1032, a furniture type of the piece of furniture represented by the obstacle is determined, and the furniture type includes temporary furniture or stationary furniture.

For example, the sweeper may first acquire a correspondence relationship between furniture and furniture types. The correspondence relationship associates one or more pieces of furniture with respective furniture types of different pieces of furniture. Then, according to the correspondence relationship between furniture and furniture types, a furniture type of the piece of furniture represented by the obstacle occupying the uncleaned area is determined. Thus, such arrangement can improve the convenience and accuracy in determining the furniture type. For example, after acquiring the S+M pieces of furniture placed in the room, the sweeper may acquire the furniture types of the S+M pieces of furniture according to the correspondence relationship. It is assumed that the sweeper determines a total of 3 pieces of furniture (e.g., a bed, a large wardrobe and a stool) in the room according to the bottom areas of the plurality of obstacles. From inquiring the correspondence relationship between furniture and furniture types, the furniture type of the bed and the large wardrobe is stationary furniture, and the furniture type of the stool is temporary furniture.

During initialization, on a screen of the sweeper, for example, an interface may be displayed for setting the correspondence relationship between furniture and furniture types, and prompting the user to perform settings by means of ringing or vibration. For example, the user may input a name of a first piece of furniture in a furniture field of the interface and then input a furniture type of the first piece of furniture in a furniture type field of the interface. It is assumed that the furniture type of the first piece of furniture is temporary furniture. After the sweeper receives the input, the sweeper stores the first piece of furniture associated with temporary furniture. After storing pieces of furniture associated with respective furniture types, the sweeper may generate the correspondence relationship between furniture and furniture types accordingly.

Alternatively, the sweeper and the terminal are connected by an infrared, Bluetooth or wireless local area network. During initialization, the user may set the correspondence relationship between furniture and furniture types on the terminal coupled to the sweeper. The terminal stores the correspondence relationship, and sends the correspondence relationship to the sweeper.

In step 1033, if the furniture type of the piece of furniture represented by the obstacle is temporary furniture, it is determined that the obstacle occupying the uncleaned area may be removed by the sweeper.

For example, if the furniture type of the piece of furniture represented by the obstacle occupying the uncleaned area is temporary furniture, such as trash cans, stools, laundry basins or other household items, it indicates that the obstacle has a relatively small volume or weight and may be moved.

In the technical solution provided in the embodiment of the present disclosure, it is determined whether the obstacle may be removed according to the furniture type of the piece of furniture represented by the obstacle. It may improve convenience and accuracy of determining movability of the obstacle.

In an embodiment, if the furniture type of the piece of furniture represented by the obstacle is temporary furniture, the sweeper may determine whether the piece of furniture is a preset removable furniture. If the piece of furniture is the preset removable furniture, it is determined that the obstacle occupying the uncleaned area can be removed by the sweeper.

In practical application, not all temporary furniture may be moved. The sweeper moving household items such as trash cans, stools or laundry basins may not have any unintended consequences. But if the sweeper moves a vase or a stroller, it is likely to break the vase or injure a baby in the stroller. Therefore, during initialization, multiple pieces of preset movable furniture may be stored in the sweeper, the multiple pieces of preset movable furniture is furniture that can be moved safely by the sweeper. When the furniture type of the piece of furniture represented by the obstacle occupying the uncleaned area is determined as temporary furniture, the sweeper may also determine whether the piece of furniture is any one of the multiple pieces of preset movable furniture. If the piece of furniture is any one of the multiple pieces of preset movable furniture, it indicates that the piece of furniture is the preset movable furniture, that is, the obstacle corresponding to the piece of furniture may be moved. If the piece of furniture is not any one of the multiple pieces of preset movable furniture, the piece of furniture represented by the obstacle does not meet the requirement of safe movement, that is, the obstacle corresponding to the piece of furniture may not be moved.

In the technical solution provided in the embodiment of the present disclosure, when it is determined that the furniture type of the piece of furniture represented by the obstacle is temporary furniture, it may be further determined whether the piece of furniture is a preset movable furniture. When the piece of furniture is a preset movable furniture, it is determined that that the obstacle occupying the uncleaned area may be removed, avoiding unexpected damage caused by the movement of furniture such as a stroller or a vase during cleaning.

Figure 1C:
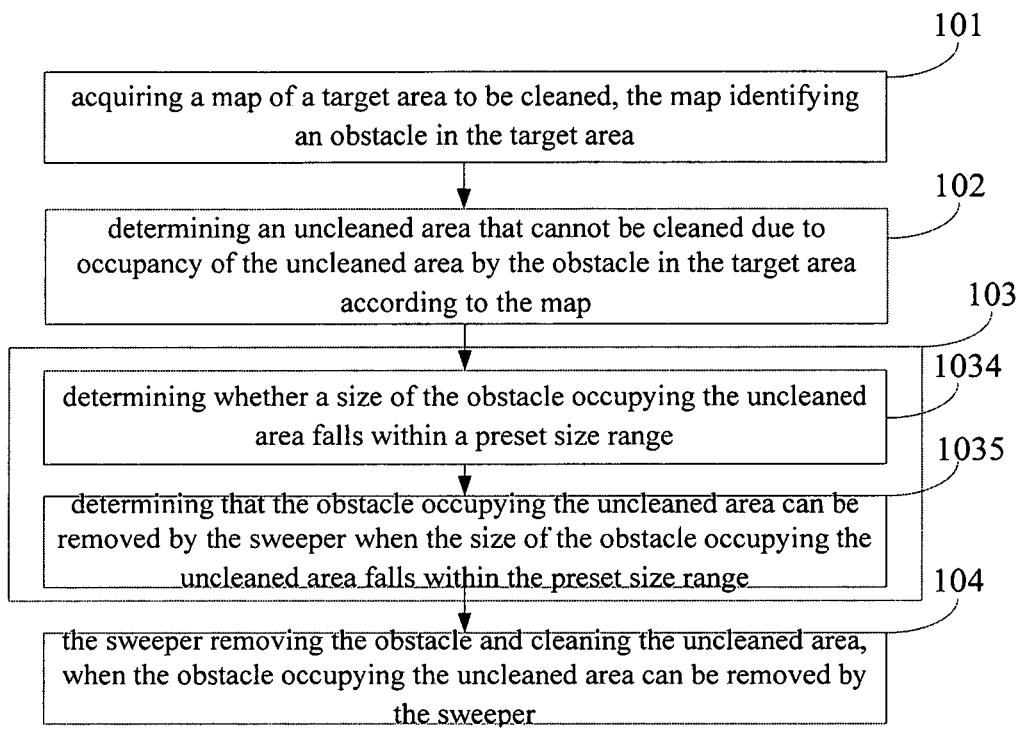
FIG. 1c is a flowchart illustrating a cleaning method according to an exemplary embodiment.

In an embodiment, as shown in FIG. 1c, in step 103, determining whether the obstacle occupying the uncleaned area may be removed by the sweeper may be performed through steps 1034 to 1035.

In step 1034, it is determined whether a size of the obstacle occupying the uncleaned area falls within a preset size range.

In step 1035, if the size of the obstacle falls within the preset size range it is determined that the obstacle occupying the uncleaned area may be removed by the sweeper.

For example, the sweeper may also determine whether the obstacle may be removed according to the size of the obstacle. Specifically, during initialization, the user may set a preset size range in the sweeper. The preset size range defines a maximum size and a minimum size of removable obstacles. If the size of the obstacle is too large, e.g. exceeding the maximum size, it is difficult for the sweeper to move the obstacle, and it may determine that the obstacle cannot be removed. On the other hand, if the size of the obstacle is too small, e.g. smaller than the minimum size, the sweeper may hardly handle the balance during the movement of the obstacle and tend to cause the obstacle to collapse if moves it, and therefore, it may also be determined that the obstacle cannot be removed.

Specifically, the sweeper may scan the obstacle occupying the uncleaned area by the sensor mounted on the sweeper, and determine a size ratio of the obstacle relative to the size of the sweeper. Further, the sweeper may acquire a size of the obstacle in any direction according to the size of the sweeper. Then the sweeper may determine whether the size of the obstacle in any direction falls within the preset size range. That is, whether a size of the obstacle in any direction falls within the preset size range. If the sizes of the obstacle in all directions fall within the preset size range, it indicates that the obstacle can be removed by the sweeper; otherwise, it indicates that the obstacle cannot be removed.

In the technical solution provided in the embodiment of the present disclosure, it is determined whether the obstacle may be removed according to the size of the obstacle. Such arrangement may improve convenience and accuracy of determining movability of the obstacle.

In an embodiment, if the size of the obstacle falls within the preset size range, the sweeper may also acquire a thrust force required for removing the obstacle, and determine whether the obstacle may be removed by the sweeper according to the thrust force required.

In practical application, although an obstacle may have a size falling within the preset size range, the obstacle may have a large frictional force with the floor where it is placed. That is, a thrust force required for moving the obstacle is relatively large, and it is difficult to move the obstacle or to handle balance while moving the obstacle. Therefore, during initialization, the user may store a preset thrust threshold value in the sweeper, the preset thrust threshold value defining an upper limit of the thrust force for the sweeper to move an obstacle. When it is determined that the size of the obstacle falls within the preset size range, the sweeper may acquire a thrust force required for removing the obstacle. If it is determined that the thrust force required is smaller than or equal to the preset thrust threshold value, it is determined that the obstacle can be removed by the sweeper. If it is determined that the thrust force required is larger than the preset thrust threshold value, it is determined that the obstacle cannot be removed.

Specifically, when it is determined that the size of the obstacle falls within the preset size range, the sweeper may move to the obstacle, adjust the thrust force to a minimum value after contacting with the obstacle at an optimal acting point. Then, the sweeper may gradually increase the thrust force to determine whether the obstacle moves. If the obstacle moves when the sweeper adjusts the thrust force to a first thrust force value, it indicates that the thrust force required for removing the obstacle is the first thrust force value. If the first thrust force value is greater than the preset thrust threshold value, it indicates that the obstacle may not be removed; if the first thrust force value is less than or equal to the preset thrust threshold value, it indicates that the obstacle may be removed by the sweeper.

Alternatively, during initialization, a correspondence relationship between furniture and thrust forces may be stored in the sweeper. The correspondence relationship associates various pieces of furniture with respective thrust forces required to move them. When the sweeper determines that the size of the obstacle falls within the preset size range, the sweeper may acquire the piece of furniture represented by the obstacle. Then, the sweeper may inquire the correspondence relationship between furniture and thrust forces, to acquire the thrust force required for removing the piece of furniture. If the thrust force is greater than the preset thrust threshold value, it indicates that the obstacle corresponding to the piece of furniture may not be removed; if the thrust is less than or equal to the preset thrust threshold value, it indicates that the obstacle corresponding to the piece of furniture may be removed by the sweeper.

In the technical solution provided in the embodiment of the present disclosure, it is determined whether the obstacle may be removed according to the size of the obstacle and the magnitude of the thrust force required for moving the obstacle. Such arrangement may improve convenience and accuracy of determining movability of the obstacle.

In practical application, at least a portion of the method may also be performed by a terminal, which may be a mobile phone, a tablet computer, a smart watch and other devices capable of connecting to a sweeper, which is not limited in the embodiment of the present disclosure. The terminal and the sweeper may be connected via an infrared, Bluetooth or wireless communication network.

After the sweeper acquires the map, the sweeper may send the map to the terminal. The terminal may determine an uncleaned area in the target area which cannot be cleaned due to occupancy of the uncleaned area by the obstacle according to the map and then determine whether the obstacle occupying the uncleaned area may be removed by the sweeper. If the obstacle occupying the uncleaned area may be removed by the sweeper, the terminal may generate a first operation instruction and send it to the sweeper. The first operation instruction instructs the sweeper to remove the obstacle and clean the uncleaned area occupied by the obstacle.

Alternatively, after receiving the map marked with a plurality of obstacles and sent by the sweeper, the terminal marks all the areas that cannot be cleaned due to occupancy by the plurality of obstacles as the uncleaned areas. That is, a plurality of uncleaned areas may be determined according to the map. Then, the terminal determines successively whether an obstacle occupying each uncleaned area may be removed by the sweeper, and generates a second operation instruction according to the determination result, and then sends the second operation instruction to the sweeper. The second operation instruction instructs the sweeper to successively remove the obstacles which are determined as removable, and clean the uncleaned areas occupied by the obstacles.

Specifically, the terminal may determine whether the obstacle can be removed by the sweeper according to the furniture type of the piece of furniture represented by the obstacle occupying each uncleaned area, or determine whether the obstacle can be removed by the sweeper according to the size of the obstacle occupying each uncleaned area, which is not limited in this embodiment of the present disclosure.

In practical application, the sweeper may also determine whether an obstacle encountered can be removed by the sweeper when cleaning the target area, move the obstacle to another area when it is determined that the obstacle can be removed by the sweeper, clean the area originally occupied by the obstacle, and then move the obstacle back to its original position. Specifically, when the sweeper is cleaning the target area, if a first obstacle is encountered, the sweeper may first acquire a piece of furniture represented by the first obstacle, then determine the furniture type of the piece of furniture, and further determine whether the obstacle can be removed by the sweeper according to the furniture type. If the obstacle can be removed by the sweeper, the sweeper may move the obstacle to other area, clean the area originally occupied by the obstacle, and then move the obstacle to its original position. If the obstacle cannot be removed, the sweeper may bypass the obstacle and continue to clean other areas.

The implementation will be described in detail with reference to some embodiments.

Figure 2:
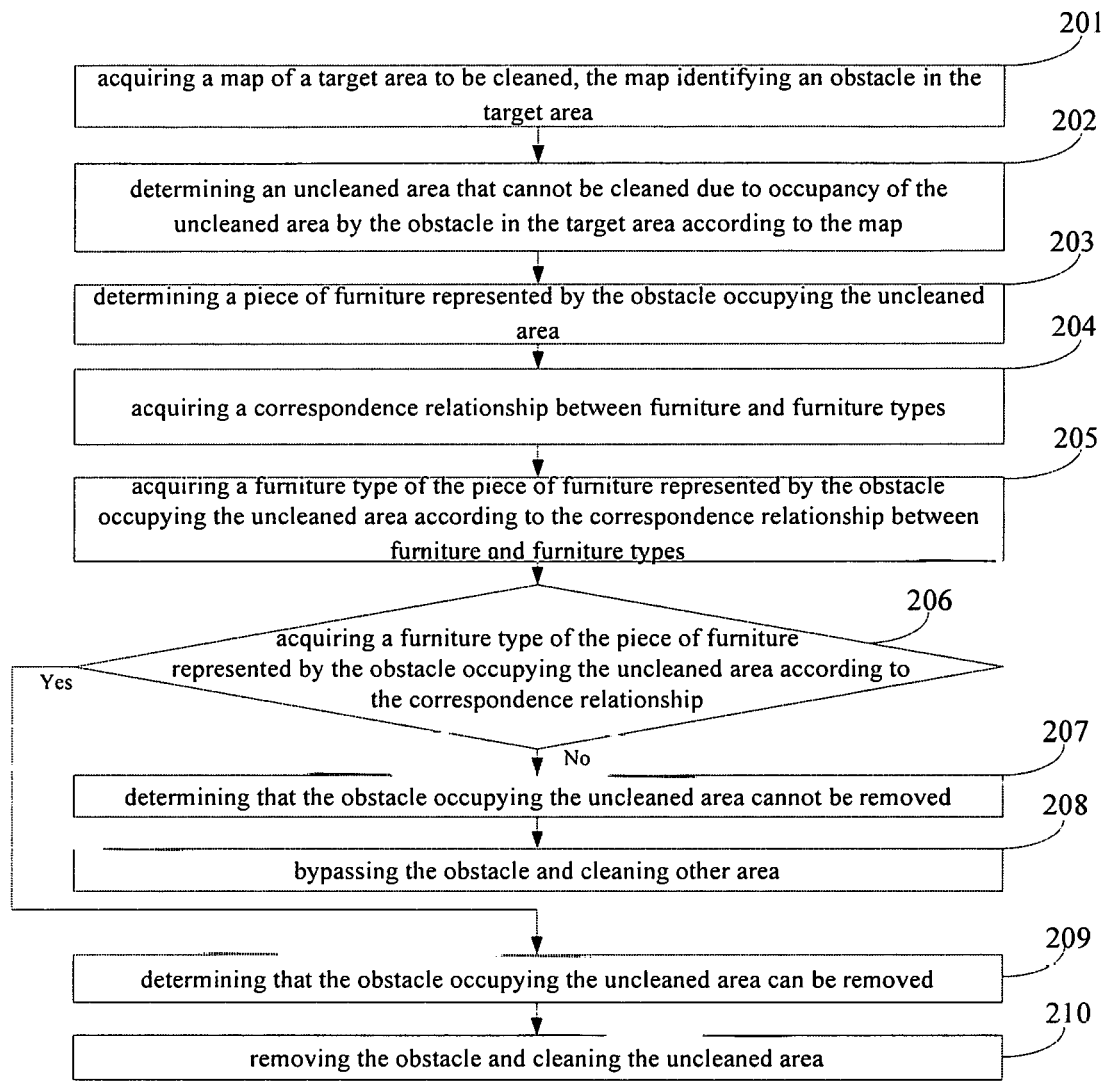
FIG. 2 is a flowchart illustrating a cleaning method according to an exemplary embodiment.

FIG. 2 is a flowchart illustrating a cleaning method according to an exemplary embodiment, which is performed by a sweeper. As shown in FIG. 2, the method includes the following steps 201 to 202.

In step 201, a map of a target area to be cleaned is acquired, the map identifying an obstacle in the target area, and step 202 is performed.

In step 202, an uncleaned area that cannot be cleaned due to occupancy of the uncleaned area by the obstacle in the target area is determined according to the map, and step 203 is performed.

In step 203, it is determined a piece of furniture represented by the obstacle occupying the uncleaned area, and step 204 is performed.

In step 204, a correspondence relationship between furniture and furniture types is acquired, and the correspondence relationship associating pieces of furniture and respective furniture types, and step 205 is performed.

In step 205, a furniture type of the piece of furniture represented by the obstacle occupying the uncleaned area is acquired according to the correspondence relationship between furniture and furniture types, and step 206 is performed.

In step 206, if the furniture type of the piece of furniture represented by the obstacle occupying the uncleaned area is temporary furniture, it is determined whether the piece of furniture is a preset movable furniture. If the piece of furniture is not the preset movable furniture, step 207 is performed, and if the piece of furniture is the preset movable furniture, step 209 is performed.

In step 207, it is determined that the obstacle occupying the uncleaned area cannot be removed, and step 208 is performed.

In step 208, the obstacle is bypassed and other area is cleaned. The process ends.

In step 209, it is determined that the obstacle occupying the uncleaned area can be removed, and step 210 is performed.

In step 210, the obstacle is removed and the uncleaned area is cleaned.

In the embodiment of the present disclosure, there is provided a cleaning method. When an obstacle is encountered during cleaning, the area occupied by the obstacle may be marked as an uncleaned area, and when it is determined that the obstacle occupying the area can be removed, the obstacle is removed and the area is cleaned. Such arrangement can improve flexibility in cleaning a room, ensure cleaning quality, and improve user experience.

Figure 3:
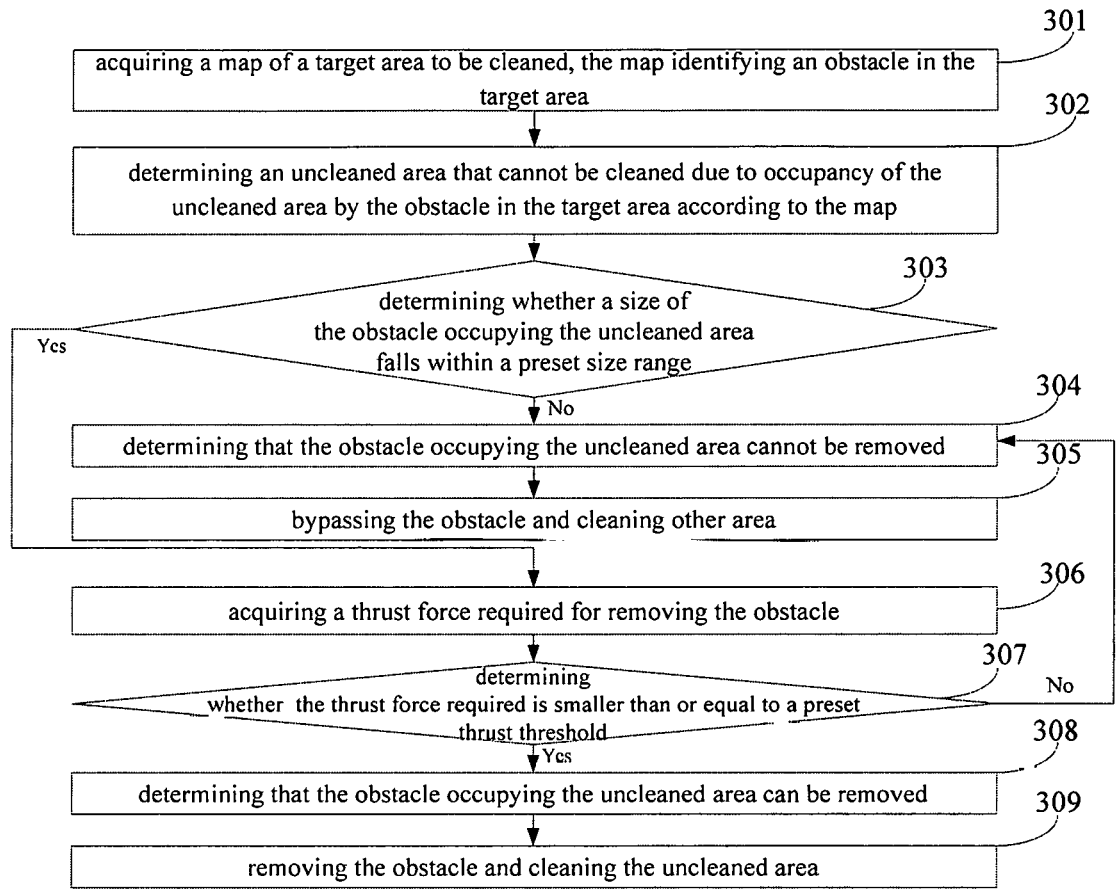
FIG. 3 is a flowchart illustrating a cleaning method according to an exemplary embodiment.

FIG. 3 is a flowchart illustrating a cleaning method according to an exemplary embodiment, which is performed by a sweeper. As shown in FIG. 3, the method includes the following steps 301 to 309.

In step 301, a map of a target area to be cleaned is acquired, the map identifying an obstacle in the target area, and step 302 is performed.

In step 302, an uncleaned area that cannot be cleaned due to occupancy of the uncleaned area by the obstacle in the target area is determined according to the map, and step 303 is performed.

In step 303, it is determined whether a size of the obstacle occupying the uncleaned area falls within a preset size range. If the size of the obstacle occupying the uncleaned area does not fall within the preset size range, step 304 is performed. If the size of the obstacle occupying the uncleaned area falls within the preset size range, step 306 is performed.

In step 304, it is determined that the obstacle occupying the uncleaned area cannot be removed, and step 305 is performed.

In step 305, the obstacle is bypassed and other area is cleaned. The process ends.

In step 306, a thrust force required for removing the obstacle is acquired, and step 307 is performed.

In step 307, it is determined whether the thrust force required is smaller than or equal to a preset thrust threshold. If the thrust force required is larger than the preset thrust threshold, step 304 is performed. If the thrust force required is smaller than or equal to the preset thrust threshold value, step 308 is performed.

In step 308, it is determined that the obstacle occupying the uncleaned area can be removed by the sweeper, and step 309 is performed.

In step 309, the obstacle is removed and the uncleaned area is cleaned.

In the embodiment of the present disclosure, there is provided a cleaning method. When an obstacle is encountered during cleaning, the area occupied by the obstacle may be marked as an uncleaned area, and when it is determined that the obstacle occupying the area can be removed, the obstacle is removed and the area is cleaned. Such arrangement can improve flexibility in cleaning a room, ensure cleaning quality, and improve user experience.

The following are device embodiments of the present disclosure and may be used to execute the method embodiments of the present disclosure.

Figure 4A:
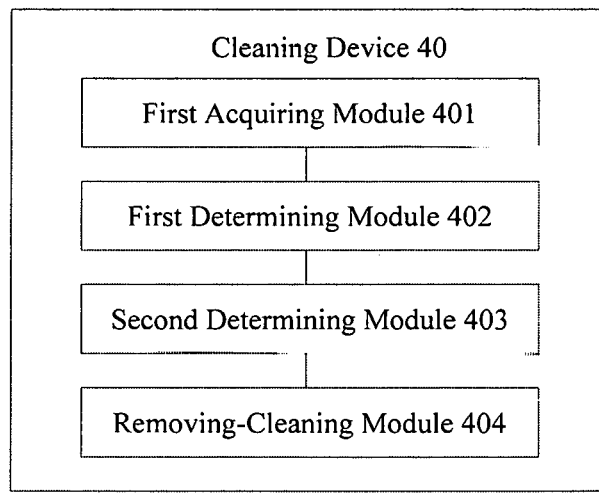
FIG. 4a is a block diagram illustrating a cleaning device according to an exemplary embodiment.

FIG. 4*a* is a block diagram illustrating a cleaning device 40 according to an exemplary embodiment. The device 40 may be implemented as part or all of an electronic device by software, hardware, or a combination of both. As shown in FIG. 40*a*, the cleaning device 40 includes a first acquiring module 401, a first determining module 402, a second determining module 403 and a removing-cleaning module 404.

The first acquiring module 401 is configured to acquire a map of a target area to be cleaned, the map identifying an obstacle in the target area.

The first determining module 402 is configured to determine an uncleaned area that cannot be cleaned due to occupancy of the uncleaned area by the obstacle in the target area according to the map.

The second determining module 403 is configured to determine whether the obstacle occupying the uncleaned area can be removed by the sweeper.

The removing-cleaning module 404 is configured to remove the obstacle and clean the uncleaned area, when the obstacle occupying the uncleaned area can be removed by the sweeper.

Figure 4B:
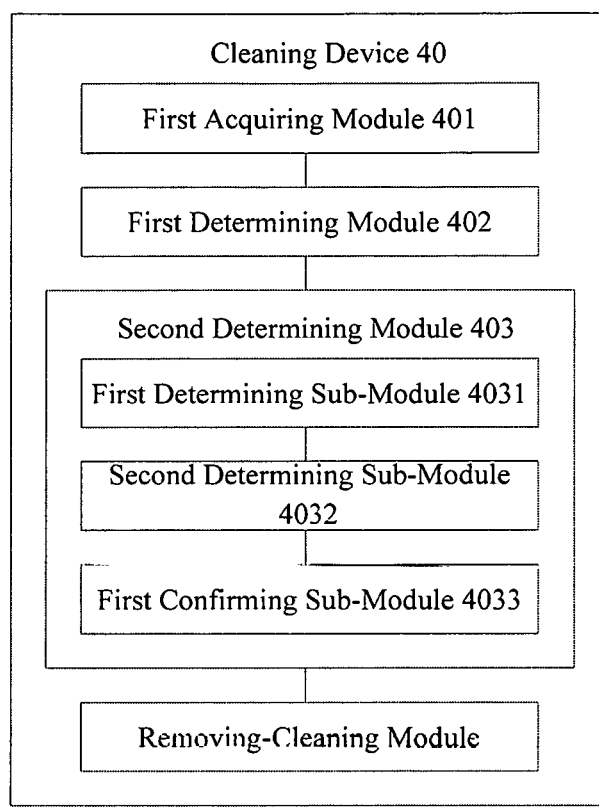
FIG. 4b is a block diagram illustrating a cleaning device according to an exemplary embodiment.

In an embodiment, as shown in FIG. 4*b*, the second determining module 404 includes: a first determining sub-module 4031, a second determining sub-module 4032 and first confirming sub-module 4033.

The first determining sub-module 4031 is configured to determine a piece of furniture represented by the obstacle occupying the uncleaned area.

The second determining sub-module 4032 is configured to determine a furniture type of the piece of furniture represented by the obstacle, the furniture type including temporary furniture or stationary furniture.

The first confirming sub-module 4033 is configured to determine that the obstacle occupying the uncleaned area can be removed by the sweeper when the furniture type of the piece of furniture represented by the obstacle is temporary furniture.

Figure 4C:
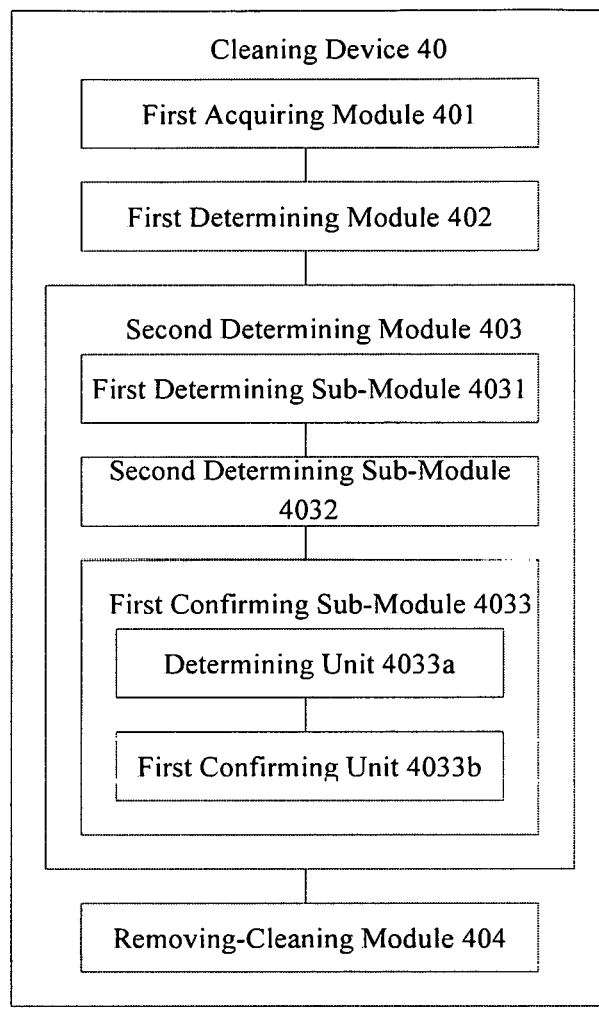
FIG. 4c is a block diagram illustrating a cleaning device according to an exemplary embodiment.

In an embodiment, as shown in FIG. 4*c*, the first confirming sub-module 4033 includes: a determining unit 4033*a* and a first confirming unit 4033*b*.

The determining unit 4033*a* is configured to determine whether the piece of furniture represented by the obstacle is a preset removable furniture when the furniture type of the piece of furniture is temporary furniture.

The first confirming unit 4033*b* is configured to determine that the obstacle occupying the uncleaned area can be removed by the sweeper when the piece of furniture is the preset removable furniture.

Figure 4D:
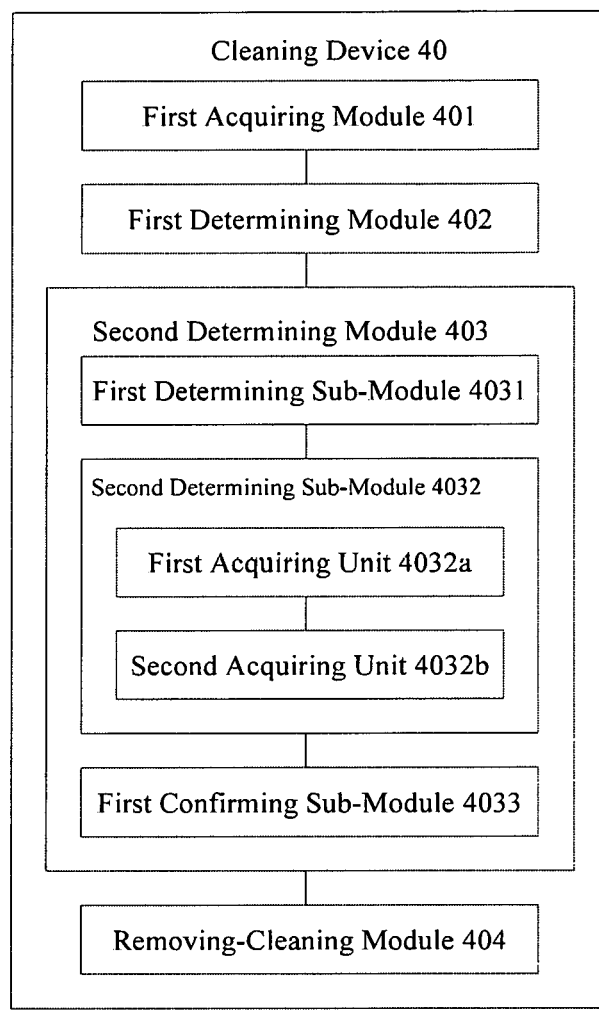
FIG. 4d is a block diagram illustrating a cleaning device according to an exemplary embodiment.

In an embodiment, as shown in FIG. 4*d*, the second determining sub-module 4032 includes: a first acquiring unit 4032*a* and a second acquiring unit 4032*b*.

The first acquiring unit 4032*a* is configured to acquire a correspondence relationship between furniture and furniture types, the correspondence relationship associating pieces of furniture with respective furniture types of the pieces of furniture.

The second acquiring unit 4032*b* is configured to acquire a furniture type of the piece of furniture represented by the obstacle occupying the uncleaned area according to the correspondence relationship between furniture and furniture types.

Figure 4E:
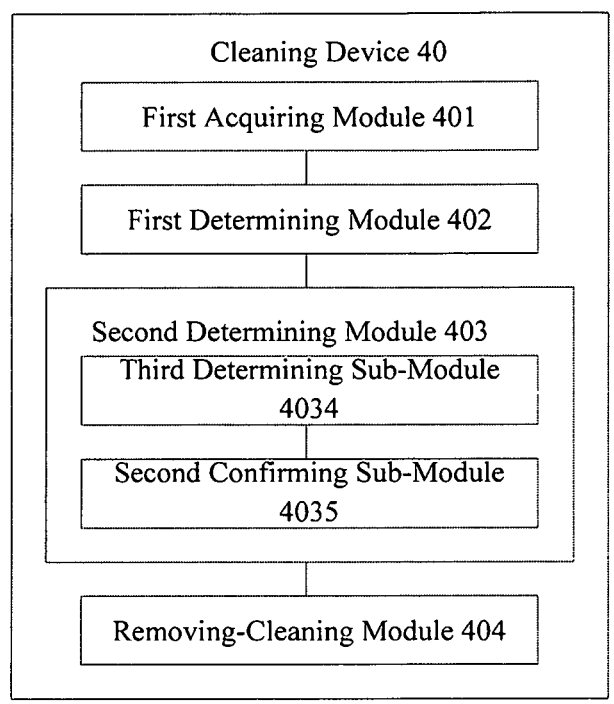
FIG. 4e is a block diagram illustrating a cleaning device according to an exemplary embodiment.

In an embodiment, as shown in FIG. 4*e*, the second determining module 403 includes: a third determining sub-module 4034 and a second confirming sub-module 4035.

The third determining sub-module 4034 is configured to determine whether a size of the obstacle occupying the uncleaned area falls within a preset size range.

The second confirming sub-module 4035 is configured to determine that the obstacle occupying the uncleaned area can be removed by the sweeper when the size of the obstacle occupying the uncleaned area falls within the preset size range.

Figure 4F:
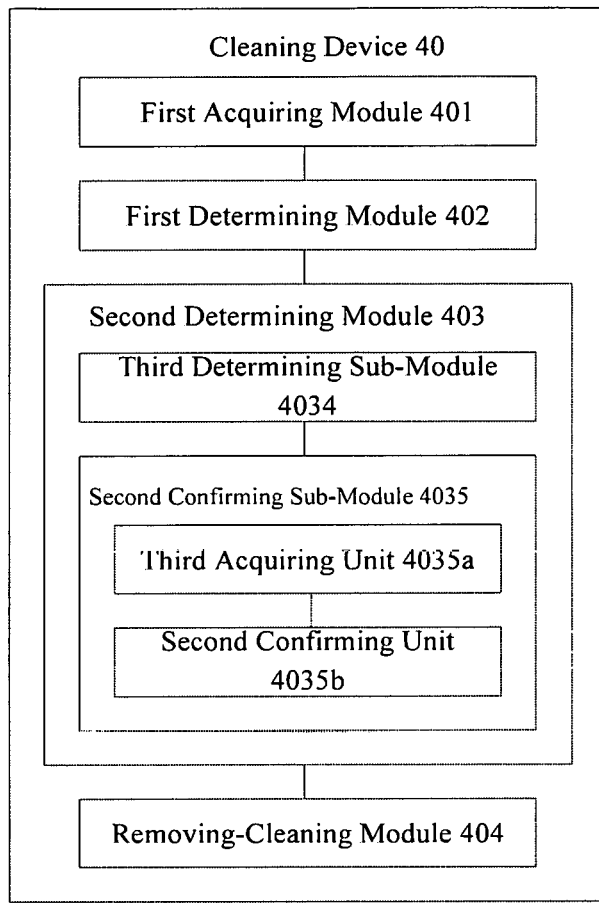
FIG. 4f is a block diagram illustrating a cleaning device according to an exemplary embodiment.

In an embodiment, as shown in FIG. 4*f*, the second confirming sub-module 4035 includes: a third acquiring unit 4035*a* and a second confirming unit 4035*b*.

The third acquiring unit 4035*a* is configured to acquire a thrust force required for removing the obstacle when the size of the obstacle occupying the uncleaned area falls within the preset size range.

The second confirming unit 4035*b* is configured to determine that the obstacle occupying the uncleaned area can be removed by the sweeper when the thrust force required is smaller than or equal to a preset thrust threshold value.

Figure 4G:
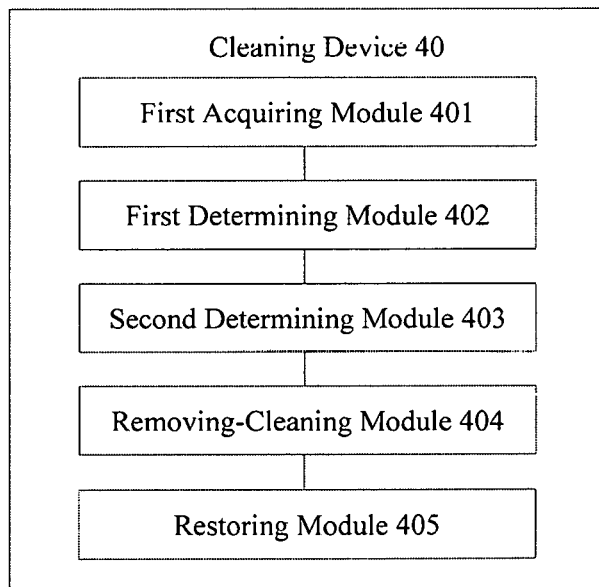
FIG. 4g is a block diagram illustrating a cleaning device according to an exemplary embodiment.

In an embodiment, as shown in FIG. 4*g*, the cleaning device 40 may further include: a restoring module 405. The restoring module 405 is configured to move the obstacle to an original position of the uncleaned area and mark the uncleaned area as a cleaned area after the cleaning is completed.

The embodiments of the present disclosure provide a cleaning device. When an obstacle is encountered during cleaning, the device may mark the area as an uncleaned area, and when it is determined that the obstacle occupying the area may be removed, remove the obstacle and clean the area. Such arrangement can improve flexibility in cleaning a room, ensure cleaning quality, and improve user experience.

An embodiment of the present disclosure provides a cleaning device, including:

a processor; and a memory for storing instructions executable by the processor;

wherein the processor is configured to:

acquire a map of a target area to be cleaned by a sweeper, the map identifying an obstacle in the target area;

determine an uncleaned area that cannot be cleaned due to occupancy of the uncleaned area by the obstacle in the target area according to the map;

determine whether the obstacle occupying the uncleaned area can be removed by the sweeper; and remove the obstacle from the uncleaned area and clean the uncleaned area, if it is determined that the obstacle occupying the uncleaned area can be removed by the sweeper.

In one embodiment, the processor is further configured to: determine a piece of furniture represented by the obstacle occupying the uncleaned area; determine a furniture type of the piece of furniture, the furniture type including temporary furniture or stationary furniture; and determine that the obstacle occupying the uncleaned area can be removed when the furniture type of the piece of furniture is temporary furniture.

In an embodiment, the processor is further configured to: determine whether the piece of furniture is a preset removable furniture when the furniture type of the piece of furniture is temporary furniture; and determine that the obstacle occupying the uncleaned area can be removed when the piece of furniture is the preset removable furniture.

In an embodiment, the processor is further configured to perform: acquiring a correspondence relationship between furniture and furniture types, the correspondence relationship associating various pieces of furniture with respective furniture types; and acquiring a furniture type of the piece of furniture represented by the obstacle occupying the uncleaned area according to the correspondence relationship between furniture and furniture types.

In an embodiment, the processor is further configured to perform: determining whether a size of the obstacle occupying the uncleaned area falls within a preset size range; and determining that the obstacle occupying the uncleaned area can be removed when the size of the obstacle occupying the uncleaned area falls within the preset size range.

In an embodiment, the processor is further configured to: acquire a thrust force required for removing the obstacle when the size of the obstacle occupying the uncleaned area falls within the preset size range; and determine that the obstacle occupying the uncleaned area can be removed when the thrust force required is smaller than or equal to a preset thrust threshold value.

In an embodiment, the processor is further configured to: move the obstacle back to an original position of the uncleaned area and mark the uncleaned area as a cleaned area after the cleaning is completed.

The embodiments of the present disclosure provide a cleaning device. When an obstacle is encountered during cleaning, the device may mark the area as an uncleaned area, and when it is determined that the obstacle occupying the area may be removed, remove the obstacle and clean the area. It can improve flexibility in cleaning a room, ensure cleaning quality, and improve user experience.

With respect to the devices in the foregoing embodiments, a specific manner in which each module performs an operation has been described in detail in the embodiments related to the method, which will not be elaborated herein.

Figure 5:
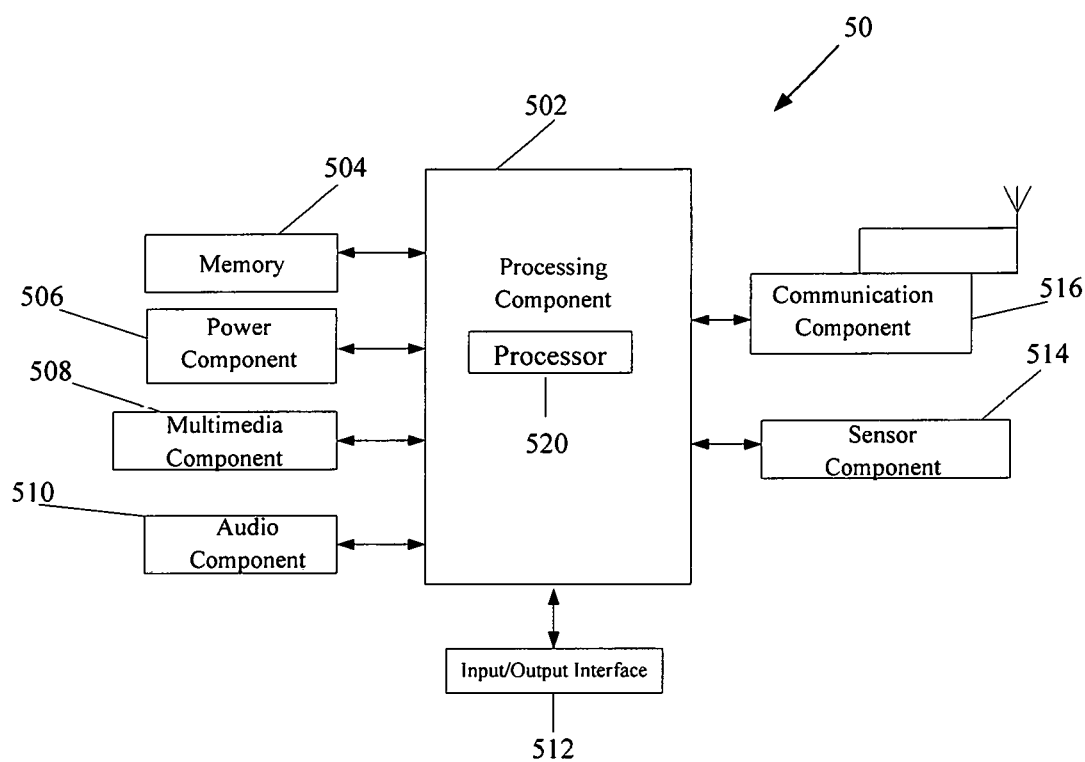
FIG. 5 is a block diagram illustrating a cleaning device according to an exemplary embodiment.

FIG. 5 is a block diagram illustrating a cleaning device 50 according to an exemplary embodiment. The device 50 is applied in a terminal device. For example, the device 50 may be a mobile phone, a messaging device, a tablet device, a smart home device, and the like.

The device 50 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the device 50, such as the operations associated with display, telephone calls, data communications, camera operations, and recording operations. The processing component 502 may include one or more processors 520 to execute instructions to perform all or part of the steps in the above method. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the device 50. Examples of such data include instructions for any applications or methods operated on the device 50, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the device 50. The power component 506 may include a power management system, one or more power sources, and any other components associated with the generation, management, and distribution of power in the device 50.

The multimedia component 508 includes a screen providing an output interface between the device 50 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 508 includes a front camera and/or a rear camera. The front camera and the rear camera may receive an external multimedia datum while the device 50 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone ("MIC") configured to receive an external audio signal when the device 50 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the device 50. For instance, the sensor component 514 may detect an open/closed status of the device 50, relative positioning of components, e.g., the display and the keypad, of the device 50, a change in position of the device 50 or a component of the device 50, a presence or absence of user contact with the device 50, an orientation or an acceleration/deceleration of the device 50, and a change in temperature of the device 50. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the device 50 and other devices. The device 50 can access a wireless network based on a communication standard, such as WiFi, 2G, or 3G, or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 50 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 504, executable by the processor 520 in the device 50, for performing the above-described method. For example, the non-transitory computer-readable storage medium may be a ROM, a RAM, a CD-ROM, a magnetic tape, a floppy disc, an optical data storage device, and the like.

An embodiment of the present disclosure provides a non-transitory computer-readable storage medium, when instructions in the storage medium is executed by a processor of the device 50, cause the device 50 to implement the above cleaning method. The method includes:

acquiring a map of a target area, the map identifying an obstacle in the target area;

determining an uncleaned area that cannot be cleaned due to occupancy of the obstacle in the target area according to the map;

determining whether the obstacle occupying the uncleaned area can be removed; and removing the obstacle and cleaning the uncleaned area, when the obstacle occupying the uncleaned area can be removed.

In one embodiment, determining whether the obstacle occupying the uncleaned area can be removed includes: determining furniture represented by the obstacle occupying the uncleaned area; determining a furniture type of the furniture, the furniture type including temporary furniture or stationary furniture; and confirming that the obstacle occupying the uncleaned area can be removed when the furniture type of the furniture is temporary furniture.

In an embodiment, confirming that the obstacle occupying the uncleaned area can be removed when the furniture type of the furniture is temporary furniture includes: determining whether the furniture belongs to preset furniture when the furniture type of the furniture is temporary furniture; and confirming that the obstacle occupying the uncleaned area can be removed when the furniture belongs to preset furniture.

In an embodiment, determining a furniture type of the furniture includes: acquiring a correspondence relationship between furniture and furniture types, the correspondence relationship describing furniture types of different pieces of furniture; and acquiring a furniture type of the furniture represented by the obstacle occupying the uncleaned area according to the correspondence relationship between furniture and furniture types.

In an embodiment, determining whether the obstacle occupying the uncleaned area can be removed includes: determining whether a size of the obstacle occupying the uncleaned area falls within a preset size range; and confirming that the obstacle occupying the uncleaned area can be removed when the size of the obstacle occupying the uncleaned area falls within the preset size range.

In an embodiment, confirming that the obstacle occupying the uncleaned area can be removed when the size of the obstacle occupying the uncleaned area falls within the preset size range includes: acquiring a thrust force required for removing the obstacle when the size of the obstacle occupying the uncleaned area falls within the preset size range; and confirming that the obstacle occupying the uncleaned area can be removed when the thrust force is smaller than or equal to a preset thrust threshold value.

In an embodiment, the cleaning method further including: moving the obstacle to an original position of the uncleaned area after the cleaning is completed.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and embodiments be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A cleaning method, applied in a sweeper, the method comprising:
   acquiring a map of a target area to be cleaned, the map identifying an obstacle in the target area;
   determining an uncleaned area that cannot be cleaned due to occupancy of the uncleaned area by the obstacle in the target area according to the map;
   determining whether the obstacle occupying the uncleaned area can be removed by the sweeper; and
   removing, by the sweeper, the obstacle from the uncleaned area and cleaning, by the sweeper, the uncleaned area, if it is determined that the obstacle occupying the uncleaned area can be removed by the sweeper;
   wherein determining whether the obstacle occupying the uncleaned area can be removed by the sweeper comprises:
      determining a piece of furniture represented by the obstacle occupying the uncleaned area;
      determining a furniture type of the piece of furniture represented by the obstacle, the furniture type comprising temporary furniture or stationary furniture; and
      determining that the obstacle occupying the uncleaned area can be removed by the sweeper when the furniture type of the piece of furniture represented by the obstacle is temporary furniture;
   wherein determining a piece of furniture represented by the obstacle occupying the uncleaned area further comprises:
      determining the obstacle occupying the uncleaned area as a first type of obstacle, when a bottom area of the obstacle occupying the uncleaned area is smaller than or equal to a first preset threshold value;
      determining the obstacle occupying the uncleaned area as a second type of obstacle, when the bottom area of the obstacle occupying the uncleaned area is larger than or equal to a second preset threshold value;
      determining, when a plurality of first type of obstacles are acquired, one or more pieces of furniture represented by the plurality of first type of obstacle based on a distance between each two of the plurality of first type of obstacles; and
      determining the piece of furniture represented by the second type of obstacle based on the bottom area of the second type obstacle; and
   wherein determining that the obstacle occupying the uncleaned area can be removed by the sweeper when the furniture type of the piece of furniture represented by the obstacle is temporary furniture comprises:
      determining whether the piece of furniture represented by the obstacle is a preset movable furniture when the furniture type of the piece of furniture is temporary furniture; and
      determining that the obstacle occupying the uncleaned area can be removed by the sweeper when the piece of furniture represented by the obstacle is the preset movable furniture.

2. The cleaning method according to claim 1, wherein determining a furniture type of the piece of furniture represented by the obstacle comprises:
   acquiring a correspondence relationship between furniture and furniture types, the correspondence relationship associating one or more pieces of furniture with respective furniture types; and
   acquiring the furniture type of the piece of furniture represented by the obstacle occupying the uncleaned area according to the correspondence relationship between furniture and furniture types.

3. The cleaning method according to claim 1, wherein determining whether the obstacle occupying the uncleaned area can be removed by the sweeper comprises:
   determining whether a size of the obstacle occupying the uncleaned area falls within a preset size range; and
   determining that the obstacle occupying the uncleaned area can be removed by the sweeper when the size of the obstacle occupying the uncleaned area falls within the preset size range.

4. The cleaning method according to claim 3, wherein determining that the obstacle occupying the uncleaned area can be removed by the sweeper when the size of the obstacle occupying the uncleaned area falls within the preset size range comprises:
   acquiring a thrust force required for removing the obstacle when the size of the obstacle occupying the uncleaned area falls within the preset size range; and
   determining that the obstacle occupying the uncleaned area can be removed by the sweeper when the thrust force required is smaller than or equal to a preset thrust threshold value.

5. The cleaning method according to claim 1, further comprising:
   moving the obstacle back to an original position of the uncleaned area and marking the uncleaned area as a cleaned area, after cleaning of the uncleaned area is completed.

6. A cleaning device, comprising:
   a processor; and
   a memory for storing instructions executable by the processor;
   wherein the processor is configured to:
   acquire a map of a target area to be cleaned by a sweeper, the map identifying an obstacle in the target area;
   determine an uncleaned area that cannot be cleaned due to occupancy of the uncleaned area by the obstacle in the target area according to the map;
   determine whether the obstacle occupying the uncleaned area can be removed by the sweeper; and
   remove the obstacle from the uncleaned area and clean the uncleaned area, if it is determined that the obstacle occupying the uncleaned area can be removed by the sweeper;
   wherein the processor is further configured to:
      determine a piece of furniture represented by the obstacle occupying the uncleaned area;
      determine a furniture type of the piece of furniture represented by the obstacle, the furniture type comprising temporary furniture or stationary furniture; and
      determine that the obstacle occupying the uncleaned area can be removed when the furniture type of the piece of furniture represented by the obstacle is temporary furniture;
   wherein the processor is further configured to:

determine the obstacle occupying the uncleaned area as a first type of obstacle, when a bottom area of the obstacle occupying the uncleaned area is smaller than or equal to a first preset threshold value;

determine the obstacle occupying the uncleaned area as a second type of obstacle, when the bottom area of the obstacle occupying the uncleaned area is larger than or equal to a second preset threshold value;

determine, when a plurality of first type of obstacles are acquired, one or more pieces of furniture represented by the plurality of first type of obstacle based on a distance between each two of the plurality of first type of obstacles; and determine the piece of furniture represented by the second type of obstacle based on the bottom area of the second type obstacle; and wherein the processor is further configured to:
determine whether a size of the obstacle occupying the uncleaned area falls within a preset size range; and determine that the obstacle occupying the uncleaned area can be removed when the size of the obstacle occupying the uncleaned area falls within the preset size range.

7. The cleaning device according to claim 6, wherein the processor is further configured to:
acquire a correspondence relationship between furniture and furniture types, the correspondence relationship associating one or more pieces of furniture with respective furniture types; and acquire the furniture type of the piece of furniture represented by the obstacle occupying the uncleaned area according to the correspondence relationship between furniture and furniture types.

8. The cleaning device according to claim 6, wherein the processor is further configured to:
determine whether a size of the obstacle occupying the uncleaned area falls within a preset size range; and determine that the obstacle occupying the uncleaned area can be removed when the size of the obstacle occupying the uncleaned area falls within the preset size range.

9. The cleaning device according to claim 8, wherein the processor is further configured to:
acquire a thrust force required for removing the obstacle when the size of the obstacle occupying the uncleaned area falls within the preset size range; and determine that the obstacle occupying the uncleaned area can be removed when the thrust force required is smaller than or equal to a preset thrust threshold value.

10. The cleaning device according to claim 6, wherein the processor is further configured to:
move the obstacle back to an original position of the uncleaned area and marking the uncleaned area as a cleaned area after cleaning of the uncleaned area is completed.

11. A non-transitory computer-readable storage medium having stored therein instructions that, when being executed by a processor of a device, cause the device to implement a cleaning method, the method comprising:

acquiring a map of a target area to be cleaned by a sweeper, the map identifying an obstacle in the target area;

determining an uncleaned area that cannot be cleaned due to occupancy of the uncleaned area by the obstacle in the target area according to the map;

determining whether the obstacle occupying the uncleaned area can be removed by the sweeper; and removing the obstacle from the uncleaned area and cleaning the uncleaned area, if it is determined that the obstacle occupying the uncleaned area can be removed by the sweeper;

wherein determining whether the obstacle occupying the uncleaned area can be removed by the sweeper comprises:
determining a piece of furniture represented by the obstacle occupying the uncleaned area;

determining a furniture type of the piece of furniture represented by the obstacle, the furniture type comprising temporary furniture or stationary furniture; and determining that the obstacle occupying the uncleaned area can be removed by the sweeper when the furniture type of the piece of furniture represented by the obstacle is temporary furniture;

wherein determining a piece of furniture represented by the obstacle occupying the uncleaned area further comprises:
determining the obstacle occupying the uncleaned area as a first type of obstacle, when a bottom area of the obstacle occupying the uncleaned area is smaller than or equal to a first preset threshold value;

determining the obstacle occupying the uncleaned area as a second type of obstacle, when the bottom area of the obstacle occupying the uncleaned area is larger than or equal to a second preset threshold value;

determining, when a plurality of first type of obstacles are acquired, one or more pieces of furniture represented by the plurality of first type of obstacle based on a distance between each two of the plurality of first type of obstacles; and determining the piece of furniture represented by the second type of obstacle based on the bottom area of the second type obstacle; and wherein determining that the obstacle occupying the uncleaned area can be removed by the sweeper when the furniture type of the piece of furniture represented by the obstacle is temporary furniture comprises:
determining whether the piece of furniture represented by the obstacle is a preset movable furniture when the furniture type of the piece of furniture is temporary furniture; and determining that the obstacle occupying the uncleaned area can be removed by the sweeper when the piece of furniture represented by the obstacle is the preset movable furniture.

* * * * *